Dec. 9, 1941.   R. G. CARLSON   2,265,596
VALVE
Filed March 24, 1941
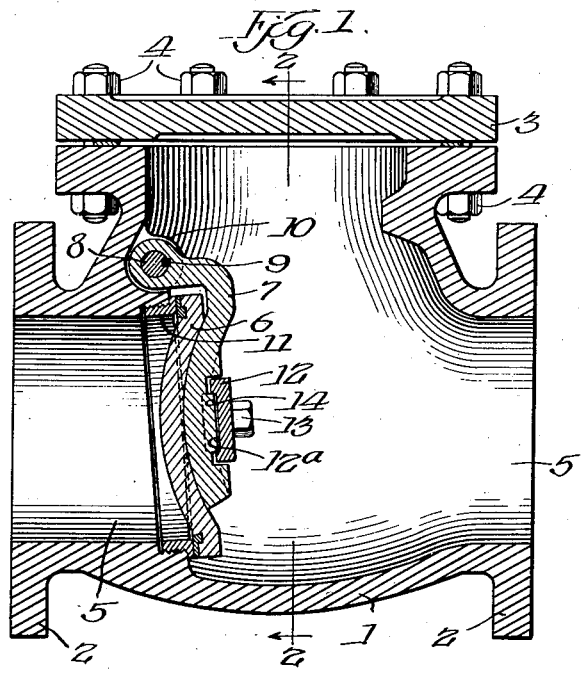
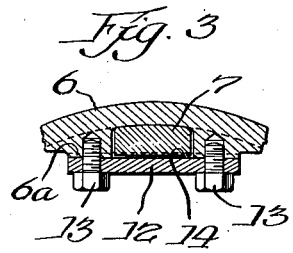
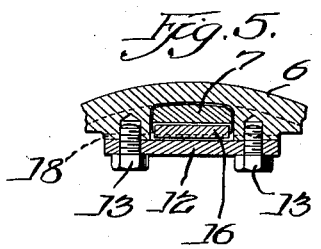
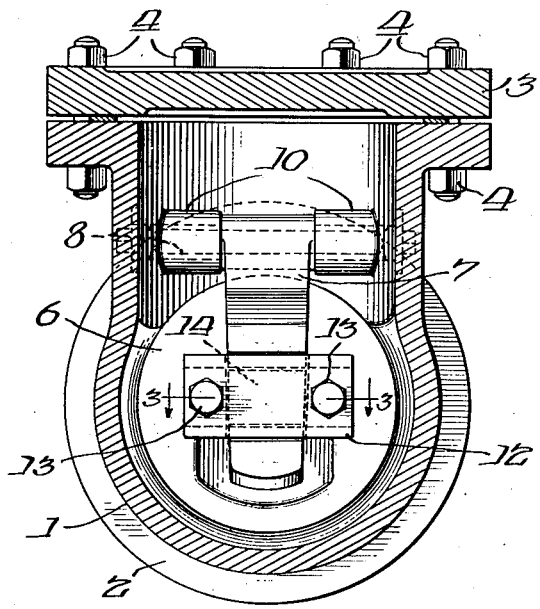
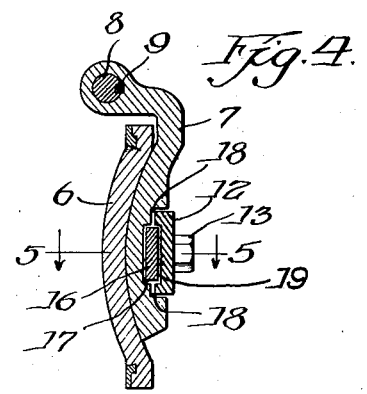
Inventor:
Ralph G. Carlson Patented Dec. 9, 1941

2,265,596

UNITED STATES PATENT OFFICE 2,265,596

VALVE

Ralph G. Carlson, Chicago, Ill., assignor to Crane Co., Chicago, Ill., a corporation of Illinois Application March 24, 1941, Serial No. 384,805

3 Claims. (Cl. 251—123)

This invention relates to a new and improved type of swing check valve and is a continuation in part of my original application identified Serial No. 286,111 filed July 24, 1939.

Heretofore it has been common knowledge that one of the objectionable features usually present in the operation of the conventional swing check valves has been the tendency for the valve, upon seating with occurrence of backflow within the pipe line, to pound or to chatter and eventually, depending upon the extent of such pounding, to cause the closure member to seat improperly due to the damage done to the hinge pin or the hinge, and in many cases to actually deface the valve seat or closure member before the cause could be detected and remedied. In further explanation, to those skilled in the art, it is accepted that upon the occurrence of backflow or with a drop in line pressure the force which draws the valve to its seat may frequently be very substantial, creating a slamming or pounding which places objectionable strain upon such valve elements as the hinge pin, the hinge, and the closure member, without adequate relief therefor.

Therefore, it is one of the principal objects of my invention to provide a swing check valve in which a transverse reinforcing member either integral therewith or separately is used to provide a better distribution of such operating strains so as to avoid distortion and breakage of the parts involved. More particularly, a holding member cooperating with the usual clapper hinge member functions to provide a predetermined amount of clearance in the clapper or closure member to create smooth and substantially trouble-free operation.

Another important object lies in providing a more uniform distribution of stress loads in contradistinction to concentrating, as heretofore, on a certain part or parts which ultimately resulted in valve failure.

Another important object of my invention is the provision of a separate insertable member for cushioning between the hinge and the transverse holding and reinforcing member so as to further eliminate possibility of damage from sudden strain.

Other objects and advantages will become more readily apparent upon proceeding with the specification in connection with the drawing, in which Fig. 1 is a sectional assembly view showing one embodiment of a closure member in a valve employing my invention.

Fig. 2 is a sectional view taken on the line 2—2 of Fig. 1.

Fig. 3 is a fragmentary sectional view taken on the line 3—3 of Fig. 2.

Fig. 4 is a partial sectional view of the disc and hinge in assembly with a further modification employing the principle of my invention.

Fig. 5 is a fragmentary sectional view taken on the line 5—5 of Fig. 4.

Like numerals refer to like parts in the various views.

Referring now to Fig. 1, the valve consists of the usual body or casing 1 provided with the end flanges or other suitable connections 2 for attachment to a pipeline, the valve preferably having the bolted cap 3 held in leak-proof relation to the casing 1 by means of the bolts 4. Transversely extending across the ports 5 is the swivelably disposed closure member 6 which is attached, as at the hinge 7, to the pin 8 preferably held in non-rotatable relation to the said hinge by means of the square key 9. As more clearly shown in Fig. 2, the pin 8 is journally supported within the opposite disposed integral bosses 10 of the casing 1. The closure member 6 seats upon the seat ring 11 forming the usual seal therefor. The seat ring 11 obviously may be made integral with the casing rather than as a separate unit, as shown.

Attention is now directed to the attachment between the hinge 7 and the closure member 6 in which construction the principle of my invention lies. More specifically, it will be noted that a holding member 12 is fixedly attached to the closure member 6 by means of the bolts 13, the latter providing an abutting contact as at 6a (see Fig. 3). A projecting portion 14 upon the hinge 7, as more clearly shown in Fig. 2, engages the hollow or grooved section 12a of the holder 12 and the hinge 7, the general plan or contour being more clearly shown by the dotted lines of Fig. 2. The projecting portion 14 thus serves the following functions: first, as between the hinge and the closure member the projecting portion allows for sufficient clearance so that when the load is suddenly placed upon the hinge in being seated such load is transmitted to its plane surface and thereby distributes the load over a larger area rather than to concentrate it upon the hinge itself; secondly, the projecting portion serves as a means in cooperation with the bolts 13 to prevent the rotation of the closure member 6; and thirdly, it limits the transverse movement of the closure member relative to the hinge. The closure member 6 and the transverse holding member 12 preferably function as if constructed integrally, the holding member 12 being firmly fastened upon the closure member 6. The shank of the hinge 7 projects through the space provided centrally of the transverse holding member 12. Due to the clearance between the raised portion 14 on the hinge and the transverse holding member 12 a predetermined amount of play is provided therebetween, the latter being sufficient to allow for the proper seating under severe line conditions, especially considering the aforesaid advantage of uniform distribution of the impact load with relation to the hinge member. Further, it will be apparent that the protrusion 14 may be a separate insertable member 16 as shown in Figs. 4 and 5 and have a clearance shown at 18 greater than the combined clearances 17 and 19 and hence this insertable member 16 performs in the same manner as the integral raised portion 14. This member 16 may be made of special material such as rubber, steel, iron, etc., or a particular material having extreme hardness under certain conditions of pressures and temperatures or it may be made of a combination of materials capable of withstanding the service and shock. Of course, the selection of the material for this member largely depends upon the kind of service to which the valve is subjected. Therefore, should it become damaged or defective, due to repeated operation, the matter of replacement is simple and economical by the substitution of a new member 16.

Accordingly, the scope of this invention should be measured by the terms of the claims appended hereto and not by the particular illustrations used to describe the application of preferred forms of my invention.

I claim:

1. A swing check valve comprising a casing, a hinge, a closure member attached to the hinge, a holder, means for attaching the said closure member to the said hinge, and means cooperating with the said hinge having a plane surface for contact with a central portion of the said holder upon seating of the said closure member, the said central portion being located substantially between the said means of attachment, whereby the load occasioned by the seating is transmitted to the holder and distributed through at least the area defined by the plane surface.

2. A swing check valve comprising a casing, a hinge, a closure member attached to the hinge, a holder, means cooperating with the said holder for attachment of the said closure member with the said hinge, and means cooperating with the said hinge having a plane surface for contact with a central portion of the said holder upon seating of the said closure member, the said central portion being located substantially between the said means of attachment, whereby the load occasioned by the seating is transmitted to the holder and distributed through at least the area defined by the plane surface, and the central portion of the holder providing a recess for containing the portion of the said means which includes the plane surface.

3. A swing check valve comprising a casing, a hinge having a transversely extending recess therein, a closure member attached to the hinge, a transverse holding member therefor recessed therein in opposed relation to the recess in the said hinge, and a separate member positioned within the opening formed by the opposed recesses.

RALPH G. CARLSON.